Dec. 13, 1966 G. CONSTANTINE, JR 3,292,001

PARAMETRIC OSCILLATOR DATA SHIFTING APPARATUS

Filed June 27, 1963

INVENTOR
GREGORY CONSTANTINE, JR.

BY David M. Koffsky

ATTORNEY

United States Patent Office 3,292,001

Patented Dec. 13, 1966

3,292,001
PARAMETRIC OSCILLATOR DATA SHIFTING APPARATUS

Gregory Constantine, Jr., Poughkeepsie, N.Y., assignor to International Business Machines Corporation, New York, N.Y., a corporation of New York Filed June 27, 1963, Ser. No. 291,157
5 Claims. (Cl. 307—88)

This invention relates to parametric oscillators and more particularly to a data shifting apparatus which utilizes parametric oscillators.

Logic systems employing parametrically excited resonant circuits or phase locked oscillators have been described by Eiichi Goto in a paper entitled "The Parametron, A Digital Computing Element Which Utilizes Parametric Oscillation," and published in the August 1959 issue of the Proceedings of the IRE. As described in the above-identified paper, a phase locked oscillator is essentially a resonant circuit with the reactance of a reactive element varying periodically at a frequency $2f$ to generate parametric oscillations at a subharmonic frequency $f$. The subharmonic parametric oscillation thus generated is stable in either of two phases which differ by $\pi$ radians. Thus a phase locked oscillator is capable of storing a binary "0" or "1" as determined by the phase of an input signal.

As is well known, the phase locked oscillator (PLO) has been utilized to implement diverse types of logic in the computer art. In each of these implementations, the most common mode for effecting the transfer of information from logic stage to logic stage has been by successive applications and removals of the excitation or pump frequency $2f$ to succeeding groups of PLO's. By continually insuring in any group of three serial PLO's, that only the middle one of the group was excited, and then advancing the excitation to the next succeeding one while simultaneously terminating the excitation of the preceding one, the information transfer could be made smoothly and efficiently. To provide this type of excitation, pump supplies were designed which would cyclically clock three successive pump excitations to three successive PLO logic stages. This was an efficient manner of operating the various logically operational areas of the data processing system; however, when such a clocking scheme was applied to serial shift registers, it was found that three PLO's were required for the storage of a single bit of information. Thus, while the triple phase clocking scheme was satisfactory for logic chains where different logical operations occurred during each clock phase, it was undesirable from the storage standpoint since three PLO's were continually tied up for the purpose of storing only a single bit of information.

In order to overcome the above-mentioned problem, it has been proposed that isolation impedances, such as saturable transformers, be inserted between serial PLO's. By saturating the transformers on either side of the PLO which has a bit of information stored therein, the necessary circuit isolation can be maintained and a lesser number of PLO's per bit utilized. While this scheme is satisfactory, it requires the addition of the saturable transformers and an auxiliary clocking system to provide for the transformer energizations.

Accordingly, it is an object of this invention to provide an improved means for assuring unidirectional data flow in a PLO network.

It is another object of this invention to provide an improved means for assuring unidirectional data flow in a PLO network wherein no interstage isolation devices are required.

It is a further object of this invention to provide an improved PLO shift register.

It is still another object of this invention to provide an improved PLO shift register wherein no more than two PLO's are required to store a single bit of information.

In accordance with the above-stated objects, impedance means having successively increasing impedances are provided between successive PLO's. By this provision, the input signal strength to a single PLO (which may essentially be a bilateral device) is always greater than any feedback signal strength into its output from a succeeding PLO. Thus, with the respective signal strengths as aforestated, a single PLO may be energized for a plurality of successive phases and will still provide a coherent storage function.

The foregoing and other objects, features and advantages of the invention will be apparent from the following more particular description of the preferred embodiments of the invention, as illustrated in the accompanying drawings.

Figures 1, 2:
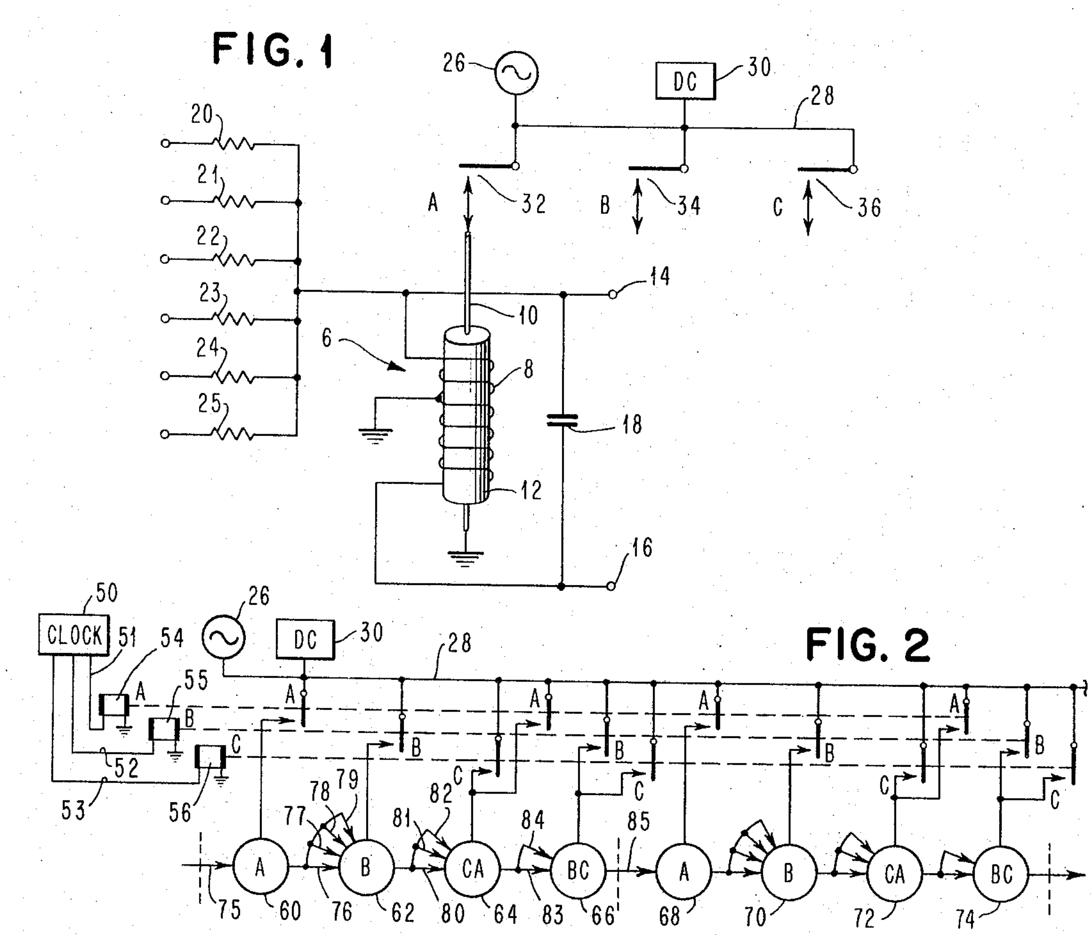
FIG. 1 is a circuit diagram of a single PLO.
FIG. 2 is a block diagram of a PLO shift register embodying the invention.

Referring now to FIG. 1, there is shown a circuit diagram of a conventional PLO. The device which provides for the parametric oscillations of the circuit is variable reactor 6. Center-tapped coil 8 is wound around wire conductor 10 upon which a ferromagnetic coating 12 has been deposited. Connected across terminals 14 and 16 of coil 8, is capacitor 18 which in combination with variable reactor 6, provides the resonant oscillations of frequency $f$. Also connected to terminal 14 are input resistors 20–25. By connecting chosen ones of the aforementioned resistors in parallel, the input impedance to the phase locked oscillator circuit can be made to vary upwardly or downwardly.

Pump signal generator 26 is a high frequency oscillator which provides the excitation or "pump" signal to the PLO circuit. The output from pump signal generator 26 is applied to bus 28, upon which there is also applied a D.C. level from D.C. power supply 30. The signal waveform appearing on bus 28 is thus a sinusoidal pump frequency $2f$ superimposed upon a D.C. level (henceforth referred to as pump excitation signal). Switches 32, 34 and 36 are provided to selectively connect the signals on bus 28 to PLO circuits (as hereinafter described). Only the switch 32 is shown connecting its respective PLO to bus 28.

The operation of the PLO of FIG. 1 is commenced by closing switch 32. This results in the pump excitation signal on bus 28 being applied via conductor 10 to variable reactance element 6. The applied excitation signal causes the magnetic coating 12 to periodically vary its state of saturation in frequency coincidence with the pump signal. This phenomenon, in turn, causes periodic variations in the reactance of coil 8 which, in combination with capacitor 18, results in the circuit becoming oscillatory. Ordinarily, if no input signal is applied to any of input resistors 20–25, the PLO oscillations will assume one of either of two phases separated by $\pi$ radians, with there being no way of telling which particular phase will be assumed. But, if a small excitation signal is applied to any one or more of input resistors 20–25, the assumed phase of the oscillations in the circuit will be coincident therewith. Once the oscillations of the circuit begin to build up in coincidence with the phase of an applied input signal, there is substantially no way of altering this buildup except by opening switch 32 and eliminating the pump excitation signal from the circuit. Thus, stably phased oscillations build up in the PLO until the circuit parameters limit their amplitude. The PLO continues to oscillate until the switch 32 is opened and the circuit deenergized.

Referring now to FIG. 2, there is shown a serial shift register embodying the invention which employs a plurality of PLO's such as shown in FIG. 1. Each PLO stage is schematically indicated by a circle having a letter or letters therein. The letters represent the specific clock phases during which each respective PLO has the pump excitation signal applied thereto. Additionally, the input resistors to each PLO are represented by simple input leads, and the connections between the input leads are indicative of the number of input resistors which are connected in parallel. For instance, into PLO 60, the input signal is applied to a single resistor; whereas into PLO 62, the input signal is applied to four resistors in parallel. (It should thus be obvious that the input signal level into PLO 62 is greater than the input signal level into PLO 60 due to the lesser input resistance of PLO 62.) The essence of the operation of the circuit of FIG. 2 is the weighting of the signal inputs to achieve directionality of information flow. While such weighting has been used in the prior art for logic purposes, no such application to the end of achieving directionality of information flow is known. By using this weighting concept in conjunction with successive applications of pump excitations to the same PLO, directionality of the information flow is maintained and less PLO's per stored bit are required.

Clock 50 is a device which sequentially energizes output conductors 51, 52 and 53 so that relay coils 54, 55 and 56 are, in turn, successively energized. Clock circuit 50 may be any well-known type of electronic circuit which produces three successive overlapping pulse outputs on the three successive lines. A simple three-stage ring counter with the outputs from each stage being applied to pulse stretchers could readily perform this function. Since the details of operation of clock 50 are not essential to the invention, no further comments with respect thereto are thought necessary; but it should be realized that there are numerous circuits which are capable of performing the required function.

Figure 3:
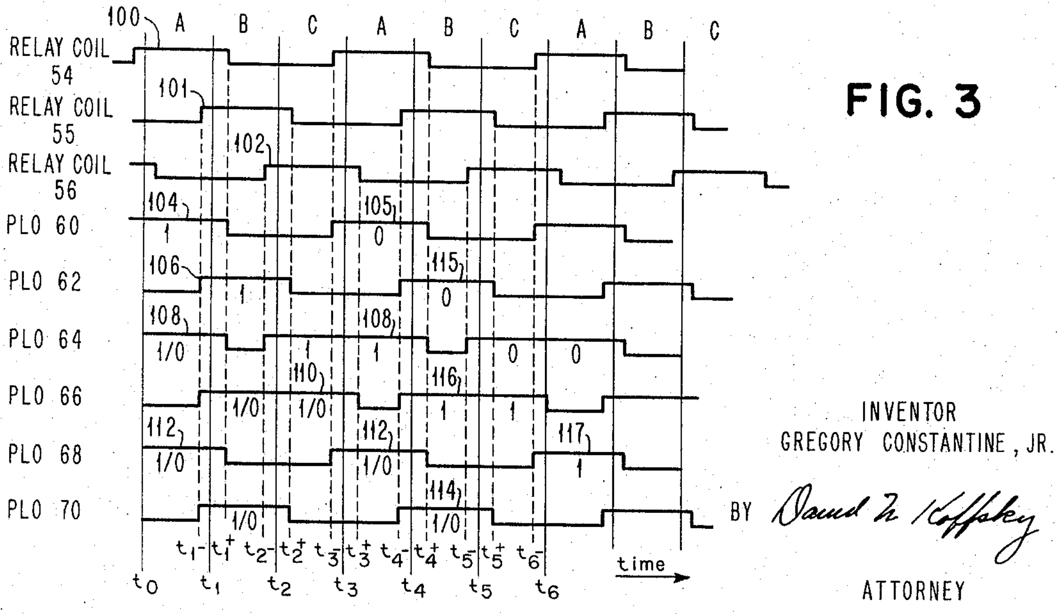
FIG. 3 is a timing diagram depicting the operation of the circuit of FIG. 2.

In FIG. 3 a timing diagram of the voltage waveforms appearing in the circuit of FIG. 2 is shown and will be used in conjunction with the description of FIG. 2 to explain its operation. In FIG. 3, the outputs from clock 50 on lines 51, 52 and 53 into relay coils 54, 55 and 56 are respectively shown as waveforms 100, 101 and 102. When relay coil 54 is energized, its period of energization will hereinafter be referred to as clock phase A. Likewise, the specific energizations of relay coils 55 and 56 will hereinafter be referred to as clock phases B and C respectively. In FIG. 3, each clock phase is indicated by a letter appearing at the top of the diagram. When relay coil 54 is energized by the output from clock 50 on line 51, it acts to close all A relay contacts. Identical functions occur with the energization of relay coils 55 and 56 with respect to all B and C relay contacts respectively. Since (as heretofore described with respect to FIG. 1) bus 28 has applied thereto the pump excitation signal from pulse generator 26 and D.C. power supply 30, the result of the closing of the A, B or C relay contacts is to cause the pump excitation signal to be applied to the PLO's associated with the respectively actuated contacts.

Referring now to FIG. 2 in conjunction with FIG. 3, the operation of the shift register will be explained. Initially, assume that a digital 1 input signal or $\pi$ phase is applied through input resistor 75 to PLO 60. Shortly before time $t_0$ (FIG. 3) clock 50 causes the energization of relay coil 54 which in turn closes all A relay contacts. This results in the application of the pump excitation signal appearing on bus 28 to each of PLO's 60, 64, 68, etc. This energization is indicated in FIG. 3 by waveforms 104, 108 and 112. As soon as the pump excitation signal is applied to PLO 60, it begins to oscillate, automatically assuming the phase of the input signal applied to input resistor 75 (in this case $\pi$ phase or "1"). The oscillations in PLO's 64 and 68 are allowed to build up in either 1 or 0 phase due to the fact that the information presently held therein is of no particular interest until the shifting operation reaches these PLO's. Henceforth, the information stored in the PLO's will be referred to in digital phase terms, i.e., 1 phase or 0 phase.

At time $t_1-$, an output signal from clock 50 on line 52 energizes relay coil 55 thereby closing all B relay contacts. This results in the pump excitation being applied to PLO's 62, 66, 70, etc. Prior to discussing the operation of PLO 62, it should be remembered that PLO 60 is presently oscillating in the 1 phase and PLO 64 is oscillating in either the 1 or 0 phase. As the oscillations begin to build up in PLO 62, they are influenced by the oscillation phases of both PLO 64 and PLO 60. However, the influence of the oscillations in PLO 60 overrides those in PLO 64 and the oscillation buildup in PLO 62 assumes the phase presently held in PLO 60. This is due to the fact that between PLO's 60 and 62, four input resistors 76–79 are connected in parallel whereas between PLO's 62 and 64 only three input resistors 80–82 are connected in parallel. Therefore, because the impedance between PLO's 60 and 62 is less than the impedance between PLO's 62 and 64, the input signal strength from PLO 60 overrides the feedback signal strength from PLO 64 and causes the oscillations of PLO 62 to build up in phase coincidence therewith. Thus, PLO 62 begins to build up in the 1 phase as indicated by waveform 106 in FIG. 3. At the same time, a similar shift of information occurs between PLO's 64 and 66, and 68 and 70 respectively.

At time $t_1+$, relay coil 54 is deenergized and all A relay contacts are caused to open resulting in the cessation of oscillations in PLO's 64 and 72. Due however to the fact that PLO's 66 and 74 also have the B phase inputs applied thereto, their oscillations continue. The significance of this will be explained in detail hereinafter. At time $t_2-$, clock 50 causes the energization of relay coil 56 which in turn closes all C relay contacts. This results in the application of the pump excitation signal to PLO's 64, 66, 72 and 74. As aforestated, PLO 62 is now oscillating in the 1 phase (waveform 106) and it is desired on this clock phase to transmit this information to PLO 64. At this time, if there no disparity in the coupling impedances between PLO's 62 and 64, and 64 and 66 respectively, there would be no way to predict which phase the oscillations of PLO 64 would assume; but since a disparity is made to exist, it can safely be said that the oscillation phase of PLO 64 on this clock phase will be determined by the oscillation phase of PLO 62. This is due to the fact that the impedance between PLO's 62 and 64 comprises three parallel connected resistors 80, 81 and 82 whereas the impedance between PLO's 64 and 66 comprises two parallel connected resistors 83 and 84. It is thus electrically obvious that the feedback signal from PLO 66 through resistors 83 and 84 has less signal strength than the input signal from PLO 62 into PLO 64. Since all that is needed is a very small amplitude input signal to cause the oscillations of a PLO to assume a set phase, the overbearing signal strength appearing from PLO 62 controls the phase of the oscillation build-up in PLO 64. Now, as shown in waveform 108 in FIG. 3, the desired 1 bit of information is held in PLO 64. As aforestated, once the oscillations build up and stabilize, they are not affected by the oscillations of an adjacent PLO. At time $t_2+$, clock 50 deenergizes relay coil 55 which in turn opens all B relay contacts, causing PLO's 62 and 70 to cease oscillating.

At time $t_3-$, clock 50 once again energizes relay coil 54 which in turn closes all A relay contacts. If it is now assumed that a 0 phase input is applied to input resistor 75, it will be obvious from the aforegoing discussion that the oscillations of PLO 60 build up in accordance with the phase of the input signal. This is shown by waveform 105 in FIG. 3. At the same time, PLO 64 (as indicated by waveform 108) continues to oscillate in the 1 phase because it has both the C and A phases applied thereto. Thus, since there is no interruption in pump signal excitation to PLO 64 due to the fact that the pump phases somewhat overlap, its oscillations remain stable in the 1 phase. Again, the information stored in PLO 68, which is also energized is completely random and is of no interest (indicated by waveform 112). All time $t_3+$, relay coil 56 is deenergized and opens all C relay contacts. This causes any PLO which is not being simultaneously energized by the A phase to cease oscillations, e.g., 66.

At time $t_4-$, relay coil 55 is energized and causes all B contacts to close. This action results in oscillation build-ups in PLO's 62, 66 and 70, etc. The information held in PLO 60 (0 phase) is transferred as before explained to PLO 62 due to the coupling impedance differences between it and PLO's 60 and 64. A like occurrence results between PLO's 64 and 66 due again to the impedance differentials. In this case, while both PLO 64 and 68 are oscillating, the feedback from PLO 68 through resistor 85 is of a lesser amplitude than the input to PLO 66 through parallel resistors 83 and 84. Thus, PLO 66 assumes the oscillation phase of the information stored in PLO 64. Summarizing, PLO 62 contains a 0 phase and PLO 66 contains a 1 phase as can be seen by referring to waveforms 115 and 116 in FIG. 3. It can now be realized that two bits of information are stored in four PLO's without the requirement of isolation devices interspersed therebetween.

Continuing, at $t_4+$, relay coil 54 is deenergized thereby opening all A contacts and deenergizing PLO's 60, 64 and 68. At time $t_5-$, relay coil 56 is energized closing all C contacts with the result that PLO 64 commences oscillating and the oscillations in PLO 66 are sustained. At this time, for the aforementioned reason of impedance differentials, the oscillations of PLO 64 build up in accordance with the phase of the oscillations in PLO 62, e.g., 0 phase. Nothing occurs in PLO 66 other than the fact that the 1 phase oscillations sustain themselves. At time $t_6-$, all A contacts are closed in the aforementioned manner and PLO's 60 and 64 commence oscillation and the oscillations in PLO 64 are sustained. At this time, a new bit of information can be entered into PLO 60 from input line 75. Additionally, the 0 phase oscillations in PLO 64 sustain themselves. The point of most interest at this stage of the operation, is between PLO 66 and 68. Between these two PLO's, a standard PLO data shift occurs (e.g., PLO's on either side deenergized) with no thought being given to impedance differentials since PLO 70 is now not oscillating. This action provides the mechanism for enabling a new sequence of increasing impedances to be utilized. Thus, the oscillations in PLO 68 build up in coincidence with the phase oscillations of PLO 66 (see waveform 117, FIG. 3), and the operation of the shift register continues in an identical manner to that above described until every other PLO has information stored therein. At this time, the register is filled to capacity and must be either read out or reset.

While the invention has been particularly shown and described with reference to preferred embodiments thereof, it will be understood by those skilled in the art that various changes in form and details may be made therein without departing from the spirit and scope of the invention. For instance, relay coils and relays are shown for clocking the pump excitation signal, but it is obvious that there are many logical circuits which would provide satisfactory identical functions, e.g., AND gates. Additionally, while this data transfer scheme is shown applied to a shift register, it may equally well be applied to general logical chains. Moreover, the number of parallel inputs to each circuit can be made greater or lesser depending on the desired leingth of the logic chain.

I claim:

1. In a device of the character described, the combination comprising:

a pump signal generator for producing pump signals;

a phase locked oscillator, said oscillator being adapted, when excited by a pump signal, to assume either a 1 or 0 phase oscillation mode;

first and second impedance means connected respectively to the input and output of said phase locked oscillator, said second impedance means having a greater impedance than said first impedance means;

means for simultaneously applying phase signals to said first and second impedance means; and switch means for permissively coupling said pump signal generator to said phase locked oscillator for causing said oscillator to begin oscillating, said oscillator invariably assuming the phase of said phase signal applied to the first impedance.

2. In a device of the character described, the combination comprising:

a pump signal generator for producing pump signals;

first and second phase locked oscillators, each said oscillator being adapted, when excited by a pump signal, to assume either a 1 or 0 phase oscillation mode.

first impedance means connected to said first phase locked oscillator;

second impedance means connected between said first and second phase locked oscillators, said second impedance means having a greater impedance than said first impedance means;

means for coupling said pump signals to said second phase locked oscillator to cause it to oscillate in either one of said phase oscillation modes;

means for applying a phase input signal to said first impedance means; and switch means for permissively coupling said pump signal generator to said first place locked oscillator to cause said first phase locked oscillator to begin oscillating, said first phase locked oscillator invariably assuming the phase of said phase input signal rather than the phase of the oscillations of said second phase locked oscillator.

3. In a device of the character described, the combination comprising:

a pump signal generator for producing pump signals;

a plurality of phase locked oscillators, each said phase locked oscillator being adapted, when excited by a pump signal, to assume either a 1 or 0 phase oscillation mode;

impedance means serially coupling said phase locked oscillators, impedance means between successive phase locked oscillators having successively greater impedances;

means for simultaneously providing at least three successive phase locked oscillators with said pump signal, whereby said successively greater coupling impedances cause the oscillation state of a phase locked oscillator to invariably assume the phase of a signal applied to its input by a preceding phase locked oscillator rather than the phase of a signal applied to its output by a succeeding phase locked oscillator.

4. In a device of the character described, the combination comprising:

a pump signal generator for producing pump signals;

a plurality of phase locked oscillators, each said phase locked oscillator being adapted when excited by a pump signal, to assume either a 1 or 0 phase oscillation mode in response to a signal of like phase provided at either its input or its output terminal;

resistive impedance means serially coupling said phase locked oscillators, resistive impedance means between successive phase locked oscillators having successively greater impedances;

means for simultaneously providing at least three successive phase locked oscillators with said pump signal, whereby said successively greater coupling impedances cause the oscillation state of a phase locked oscillator to invariably assume the phase of a signal applied to its input terminal by a preceding phase locked oscillator rather than the phase of a signal applied to its output terminal by a succeeding phase locked oscillator.

5. In a shift register, the combination comprising:
a pump signal generator for producing pump signals;
a plurality of phase locked oscillators, each said phase locked oscillator being adapted when excited by a pump signal, to assume either a 1 or 0 phase oscillation mode in response to a signal of like phase provided at either its input or its output terminal;
resistive impedance means serially coupling said phase locked oscillators, resistive impedance means between successive phase locked oscillators having successively greater impedance;
clock means for sequentially providing said pump signals to said phase locked oscillators, said clock providing at least three successive phase locked oscillators with said pump phase signal at the same time, whereby said successively greater coupling impedances cause the oscillation state of a phase locked oscillator to invariably assume the phase of a signal applied to its input terminal by a preceding phase locked oscillator rather than the phase of a signal applied to its output terminal by a succeeding phase locked oscillator.

References Cited by the Examiner

UNITED STATES PATENTS

| | | | |
|---|---|---|---|
| 2,957,087 | 10/1960 | Goto | 307—88 |
| 3,051,843 | 8/1962 | Goto | 307—88 |
| 3,108,193 | 10/1963 | Schreiner | 307—88 |

BERNARD KONICK, *Primary Examiner.*

G. LIEBERSTEIN, *Assistant Examiner.*